United States Patent
Sakezles (10) Patent No.: US 9,679,501 B2
(45) Date of Patent: Jun. 13, 2017

(54) CRICOTHYROIDOTOMY SIMULATION DEVICE

(71) Applicant: Christopher Sakezles, Tampa, FL (US)

(72) Inventor: Christopher Sakezles, Tampa, FL (US)

(73) Assignee: SYNDAVER LABS, INC., Tampa, FL (US)

( * ) Notice: Subject to any disclaimer, the term of this patent is extended or adjusted under 35 U.S.C. 154(b) by 190 days.

(21) Appl. No.: 14/200,466

(22) Filed: Mar. 7, 2014

(65) Prior Publication Data
US 2014/0302475 A1    Oct. 9, 2014

Related U.S. Application Data

(60) Provisional application No. 61/774,090, filed on Mar. 7, 2013.

(51) Int. Cl.
*G09B 23/34* (2006.01)
*G09B 23/30* (2006.01)
*G09B 23/28* (2006.01)

(52) U.S. Cl.
CPC ........... *G09B 23/34* (2013.01); *G09B 23/285* (2013.01); *G09B 23/30* (2013.01)

(58) Field of Classification Search
USPC .................................. 434/262, 267, 270, 272
See application file for complete search history.

(56) References Cited

U.S. PATENT DOCUMENTS

| 2004/0126746 A1* | 7/2004 | Toly | G09B 23/28 434/262 |
| 2012/0202180 A1* | 8/2012 | Stock | G09B 23/34 434/272 |
| 2012/0282584 A1* | 11/2012 | Millon | B29C 39/003 434/272 |
| 2014/0154656 A1* | 6/2014 | Segall | G09B 23/285 434/265 |

* cited by examiner

*Primary Examiner* — James Hull
(74) *Attorney, Agent, or Firm* — Timothy H. Van Dyke; Beusse, Wolter, Sanks & Maire PLLC (57) ABSTRACT

An artificial anatomical model used in an embodiment as a simulation and training device for performing a cricothyroidotomy procedure on a patient having an upper airway obstruction is provided. Furthermore, the simulation device includes a mandible and neck base structure that geometrically mimics a human mandible and neck region with corresponding anatomical landmarks such that a cricothyroidotomy procedure can be performed on the device for training purposes in some embodiments. Moreover, various components of the device are easily removable and replaceable independent of one another, further simplifying the training process.

13 Claims, 4 Drawing Sheets

CRICOTHYROIDOTOMY SIMULATION DEVICE

CROSS-REFERENCE TO RELATED APPLICATIONS

This application is related to U.S. Provisional Application 61/774,090 filed on Mar. 7, 2013. The teachings of this application are incorporated in their entirety and priority to the application is claimed under 35 USC 119.

BACKGROUND

The subject invention relates to simulation devices provided as teaching aids and for practice of procedures including cricothyroidotomies. Upper airway obstruction is an emergency condition which could result in a fatality if the obstruction is not cleared or the airway is not opened. A cricothyroidotomy is an incision made through the skin and cricothyroid membrane to establish a patient airway during certain life-threatening situations, such as an airway obstruction by a foreign body, angioedema, or massive facial trauma. Cricothyroidotomy is often performed as a last resort in cases where orotracheal and nasotracheal intubation are impossible or contraindicated. A cricothyroidotomy is an easier and more quickly performed procedure than a tracheotomy and does not require manipulation of the cervical spine. Cricothyroidotomies are also associated with fewer complications than tracheotomies. In order to properly perform a cricothyroidotomy under pressure, it is beneficial to practice the procedure beforehand to obtain a level of confidence and knowledge about the procedure and the surrounding anatomy. Medical training such as nursing and medical school training often requires practice of medical procedures such that once a student completes his training and enters the medical field, performing these procedures on actual patients carries less risk as a result of the training obtained and the practice undertaken by the medical professional. The medical procedures requiring training and practice include cricothyroidotomy procedures.

BRIEF DESCRIPTION

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

DETAILED DESCRIPTION

There is much interest in the development of anatomic models with components that simulate those of a human with significant similarity for use in education, training, and practice of students and professionals. More preferably, an anatomic model with easily removable and replaceable anatomic structures is essential to a successful medical learning environment. The model embodiments of the subject invention may serve as a highly sophisticated testing and learning system enabling a surgeon or medical student to optimize instrumentation and surgical approaches for a particular procedure, particularly a cricothyroidotomy, before having to perform the procedure on a live patient.

In particular embodiments, the subject invention pertains to anatomic models that include components that simulate human or non-human animal components of the neck and lower facial (jaw or mandibular) region. In other embodiments, the invention pertains to anatomic models that include components that simulate human or non-human animal components of the head, neck and upper torso region (including any portion between the head and the clavicle region of the torso). The models may be used for development, experimentation, or training of students in the medical field for procedures performed in practice, or training of persons of the general population for emergency situations. Emergency situations include those in which an obstruction to an airway may occur which would require an emergency cricothyroidotomy or other procedure involving the neck region such as a thyroidostomy or laryngectomy. Because, as described above, a cricothyroidotomy procedure is often performed as a last resort, it is not a procedure that is often practiced. Furthermore, there are few devices which provide the ability to practice a cricothyroidotomy procedure having the same anatomical characteristics as that of a human or non-human animal. Therefore, it has been discovered herein a need for a device which allows medical, nursing, and paramedic students as well as the general population to perform trial procedures on an anatomic model of a human or non-human animal neck and throat region.

The subject invention would enable a medical or other student to optimize instrumentation and approaches for a cricothyroidotomy or other neck-region procedure without putting a patient at risk. Therefore, one aspect of the subject invention provides an anatomic model or device of a human or non-human neck and mandibular region including materials that closely mimic the physical properties of living tissues. The use of this model or device would enable a user to perform trial procedures in an environment that closely resembles the patient's anatomy without any risk to the patient, or the user. The model or device provided herein would therefore allow a user to learn how to perform a particular procedure before performing it on a patient. The model would be particularly useful for training procedures for cricothyroidotomies, in a non-limiting example.

Typical engineering materials, including many metals, ceramics, and plastics commonly employed in industry may be used in creating the anatomic model depending on the required analog properties. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particularly advantageous in this application because the formula may be manipulated to give a combination of water content, lubricity, abrasion resistance, and other properties characteristic of living soft tissues. In this respect these materials are particularly suited to modeling tissues such as fat or muscular tissues in addition to skin tissues. Hydrogels also provide an ideal substrate for maintaining a surface of live cells if so desired.

In exemplary embodiments, the models or devices comprise structures such as muscles, skin layers, and/or fat layers that are made of hydrogel materials. The models provide an effective teaching and training device, due to their similarity to real tissues, organs, and organ systems, as well as the simplicity in the replacement of parts or components which may be damaged or used during the training. In certain embodiments, the components of the anatomic models are replaceable independently of one another, providing a substantial cost-saving feature over current teaching devices in the field which require replacement of an entire teaching model or costly, larger portions of the model.

One important feature of certain embodiments of the subject invention is the implementation of synthetic materials that can simulate one or more physical properties of living tissues. These materials are in most cases the hydrogel materials that are designed on the basis of physical tests performed on actual living target tissues. For example, a particular analog material might be designed to exhibit a tensile strength close to 10 kPa to mimic a target tissue that exhibits a tensile strength of 10 kPa. One or more components made from these materials are then assembled into a configuration that mimics both the size and geometry of the target anatomic structure.

The models of the subject invention may employ a wide variety of hydrogel materials, including but not limited to polyvinyl alcohol, polyvinyl pyrrolidone, polyethylene oxide, polyhydroxyethyl methacrylate; polyethylene glycol, hyaluronic acid, gelatin, carrageen, alginates, chondroitan sulfate, dermatan sulfate (and other proteoglycans). This entire class of materials is physically more tissue-like simply by nature of incorporating water, but by carefully controlling such parameters as molecular structure, density, wall thickness, durometer, and many other physical properties and characteristics a good match between the actual tissue and analog material may be achieved.

Poly (vinyl alcohol) is normally produced by the acid-catalyzed hydrolysis of poly (vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 100 C to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by drawing the material, by heat treatment, or by casting the polymer in solution with a gelling agent. These agents create specific interactions between the hydroxyl groups on adjacent chains, bringing them together to improve hydrogel bonding. Many such agents are known, and this process is easily employed on a laboratory scale.

The models of the subject invention are characterized by a similarity of geometry, of individual component physical properties, and of component-to-component interfacial properties with living tissue. On the simplest level, individual model components are fabricated such that they mimic the geometry of a particular target anatomy.

The geometric data needed for fabrication is typically obtained in two ways. The traditional approach is to obtain data from the literature on morphology or from cadaver measurements. While not a bad approximation, this method is time-consuming and permits a large degree of error. A better method would be to obtain the geometric data directly from a patient.

After collecting the appropriate geometric data, the individual model components may be fabricated from appropriate analog materials. Depending on the complexity of the part and the type of materials used, the individual component might be molded, extruded, or machined. The models of the subject invention are constructed from multiple components, and these individual components are fabricated in such a way that they mimic the geometry (length, width, diameter, thickness, cross-section, shape, etc) of a particular portion of the target anatomy.

The individual components of the subject invention are assembled in such a way that the interaction between adjacent components yields the overall interaction expected in the actual target tissue. That is, the interfacial properties (bond strength, component-to-component friction, etc) between the various model components are designed to simulate the interaction between the relevant tissues in the target anatomy.

In one embodiment, an artificial anatomical model useful for cricothyroidotomy training including a mandible and neck base structure that geometrically mimics at least a portion of a human or non-human animal mandible and neck region extending from the mandible (or mandibular portion) to the inferior portion of the neck is provided. At least a portion of the mandible and neck base structure may be comprised of, at least in part, a muscle portion, and a skin layer may be disposed over the muscle portion in an embodiment. The base structure includes a tracheal access window.

The model may include a mounting base, and at least a portion of the mandible and neck may include a muscle portion, wherein the muscle portion is comprised of, in part or in whole, a hydrogel, wherein the muscle portion geometrically mimics at least a portion of a human or non-human animal muscular tissue and simulates at least one predetermined physical characteristic of said muscle possessing human or non-human animal muscular tissue with at least fifty percent or more similarity, in one embodiment. The muscle portion may include an opening in the center portion of the neck region defining the tracheal access window in the base structure. The model may further include a skin layer and optionally a fat layer disposed over the muscle portion, wherein the fat layer is disposed under the skin layer, in an embodiment. The skin layer, fat layer, or skin and fat layer is comprised of, in part or in whole, a hydrogel, wherein the skin and/or fat layers geometrically mimic at least a portion of a human or non-human animal skin and/or fat tissue, respectively, and simulate at least one predetermined physical characteristic of the skin and fat possessing human or non-human animal skin and/or fat tissue with at least fifty percent or more similarity, in one embodiment. The skin and/or fat layer may include a small skin and/or fat layer opening in the center portion of the neck region which superimposes a portion of the tracheal access window, in an embodiment, and through which at least a portion of a replaceable skin component can be seen.

The at least one predetermined physical characteristic of muscle tissue, fat layer and/or skin layer comprises at least one of the following: color, tensile modulus, shear strength, puncture resistance, compressive modulus, dielectric constant, electrical conductivity, and/or thermal conductivity, in some embodiments.

Furthermore, the model may include a tracheal structure disposed within and removable from the base structure, wherein a portion of the tracheal structure is covered by the muscle portion such that a small portion of the tracheal structure is revealed through the tracheal access window defined in the muscle portion of the base structure in one embodiment. The tracheal structure comprises a tracheal aperture which is aligned with the tracheal access window of the base structure in an embodiment. A first end of the tracheal structure may be connected to the mounting base. A removable cricoid membrane may surround and be removable from at least a portion of the tracheal structure at the tracheal aperture. In one embodiment, the cricoid membrane covers the tracheal aperture.

A further embodiment includes a thyroid cartilage component affixed at least at one end to the tracheal structure and disposed ventral to the removable cricoid membrane, the thyroid cartilage component having a hyoid opening and being associated with a hyoid bone. The embodiment further includes a replaceable skin component which may be disposed over the base structure at the tracheal access window, but ventral to the thyroid cartilage component. The skin and/or fat layer may be disposed ventral to the replaceable skin component, such that the replaceable skin component is visible through a skin and/or fat layer opening, in one embodiment. In another embodiment, the model may not include the replaceable skin component, wherein the skin layer is disposed ventral to the tracheal access window and the muscle portion. Once an incision has been made in the skin and/or fat layer, the replaceable skin component may be used to cover over the tracheal access window for subsequent uses of the model. Thereafter, the incision can be made in the replaceable skin component. After the first use of the model, a skin and/or fat layer opening can be made in the skin and/or fat layer, wherein the opening is aligned with the tracheal access window such that for subsequent trainings, an incision can be made in the portion of the replaceable skin component which appears through the skin and/or fat layer opening.

In a further embodiment, the cricoid membrane can be secured to the tracheal structure. The cricoid membrane may be secured with any type of fastener known to those of skill in the art. In one particular embodiment, for example, the cricoid membrane may be secured to the tracheal structure with one or more ring clips.

In a further embodiment, the components of the model including the tracheal structure, the cricoid membrane, and the replaceable skin component, are independently removable and replaceable of one another. Optionally, the skin and/or fat layers, and the muscle portions are independently removable and replaceable of one another. Furthermore, the thyroid cartilage component is optionally removable and replaceable independent of the other components of the model. The tracheal structure, cricoid membrane, thyroid cartilage, and the replaceable skin component are comprised of tissue analog materials, in one embodiment.

The subject device provides for easy set up and replacement of the various components, wherein the only two components which would require replacement after each use, in an embodiment, include the replaceable skin component in the center of the neck portion and the cricoid membrane on the tracheal structure.

In a further embodiment, a method of conducting a cricothyrotomy procedure on a model is provided. The method includes obtaining the artificial anatomical model useful for cricothyroidotomy training as described herein, and cutting the replaceable skin component and cricoid membrane at a location adjacent to the tracheal aperture whereby an airway incision is made through the replaceable skin component and the replaceable cricoid membrane in the tracheal structure, in an embodiment. This incision can be made in the replaceable skin component and the replaceable cricoid membrane through the hyoid opening, for example, between the hyoid bone and the thyroid cartilage component. Following the incision, an air tube can be inserted into the airway incision.

In a further embodiment, a method of reloading a cricothyroidotomy model for subsequent training usage, the model comprising (a) a mandible and neck base structure that geometrically mimics at least a portion of the mandible and neck comprised of, at least in part, a muscle portion, and a skin layer disposed over the muscle portion, the base structure defining a tracheal access window; (b) a tracheal structure disposed within and removable from the base structure; the tracheal structure comprises a tracheal aperture that is aligned with the tracheal access window, (c) a replaceable cricoid membrane surrounding the tracheal structure at the tracheal opening; (d) a thyroid cartilage component comprising a hyoid opening, wherein the thyroid cartilage component is affixed at one end to a hyoid bone and/or the tracheal structure and disposed ventral to the cricoid membrane; and (e) a replaceable skin component disposed over the base structure at the tracheal access window but ventral to the thyroid cartilage component. The method includes removing at least in part the skin layer from the muscle portion, and removing the replaceable skin component. The method further includes lifting the thyroid cartilage component, removing the cricoid membrane from the tracheal structure, and putting a replacement cricoid membrane onto the tracheal structure, and securing the cricoid membrane to the tracheal structure. The method includes laying the thyroid cartilage component down over the cricoid membrane. The method includes putting a replacement skin component over the tracheal structure above the thyroid cartilage component, and returning the skin layer over the muscle portion whereby the tracheal access window is aligned with a portion of the replacement skin component, in an embodiment.

Figure 1:
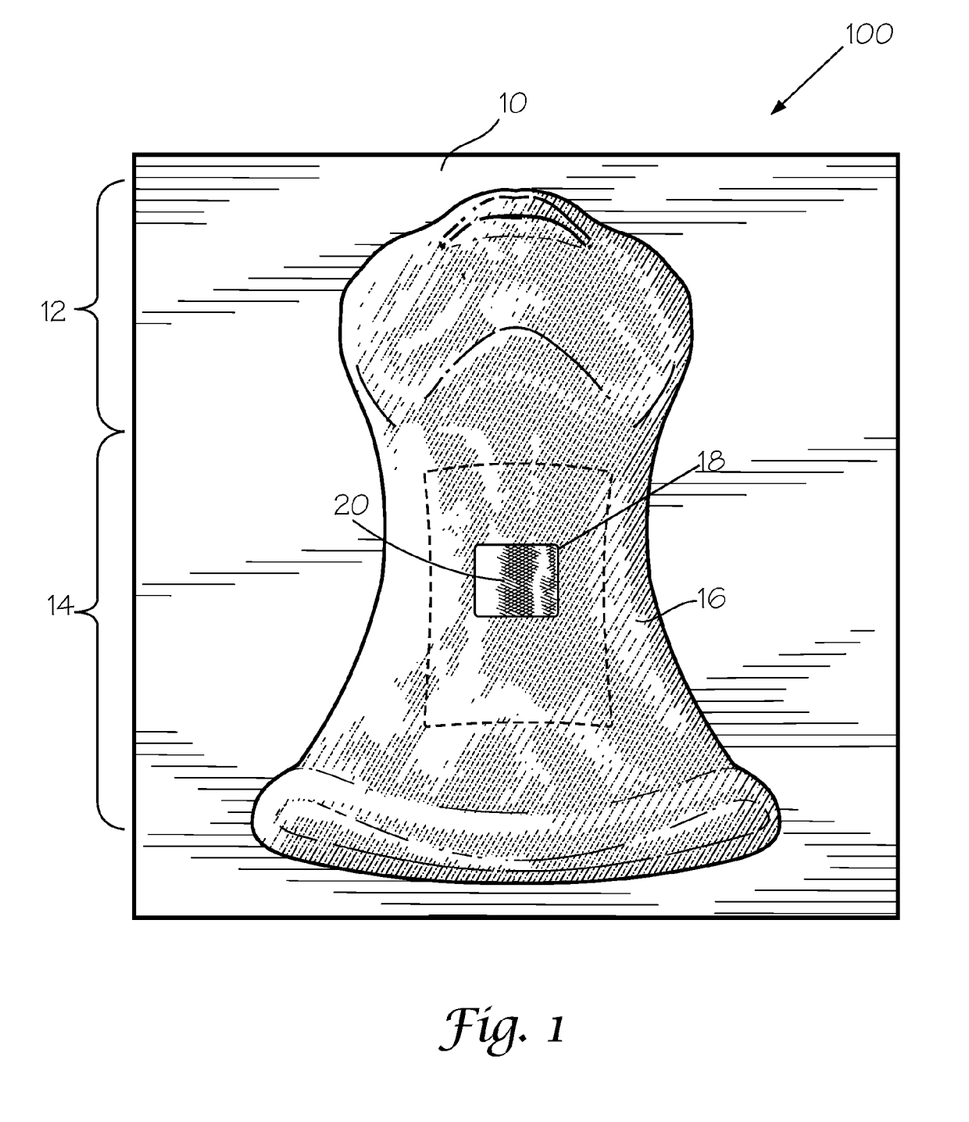
FIG. 1 provides a perspective frontal view of an embodiment of an artificial anatomical model of the subject invention useful for cricothyroidotomy or other related training.

Turning to the FIGS, FIG. 1 provides a perspective frontal view of an embodiment of an artificial anatomical model 100 of the subject invention, wherein the skin layer 16 can be seen as placed over the neck region 14 and mandible region 12 of the model 100. The skin layer 16 may include a fat layer disposed beneath it. One or more layers of skin and/or fat may be provided. A skin layer opening 18 is provided, such that a portion of a replaceable skin component 20 can be seen through the skin layer opening 18. The anatomical model 100 may be mounted on a mounting base 10 as shown in FIG. 1. Once a user has used the model to perform a procedure, the skin window 20 can be shifted such that any openings created in the skin window 20 do not appear through the opening 18 in preparation for a future procedure. Alternatively, the skin window 20 can be removed from the model 100 and replaced entirely.

Figure 2:
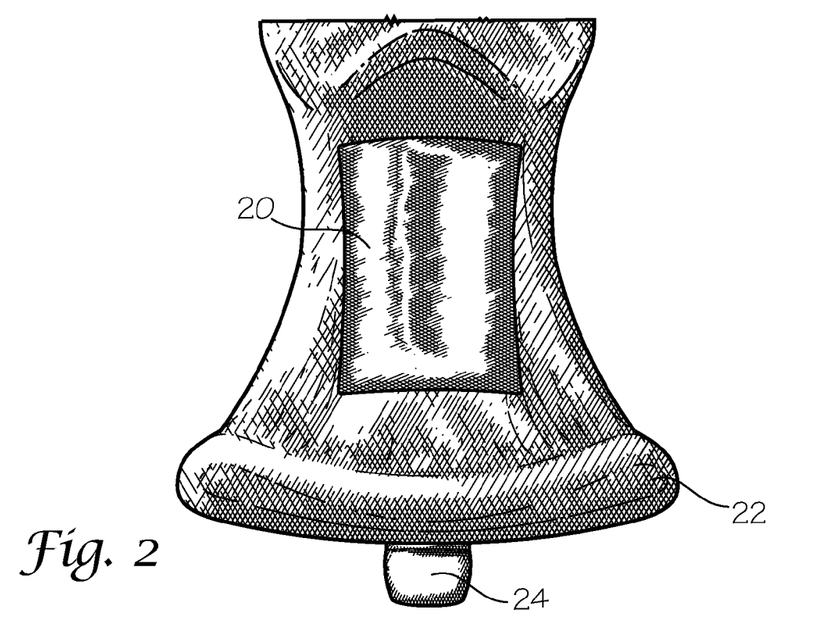
FIG. 2 provides a frontal view of an embodiment of an artificial anatomical model including a mandible and neck base structure of the subject invention with a skin and an optional fat layer removed, and with a replaceable skin component exposed and placed over a tracheal access window.
Figure 3:
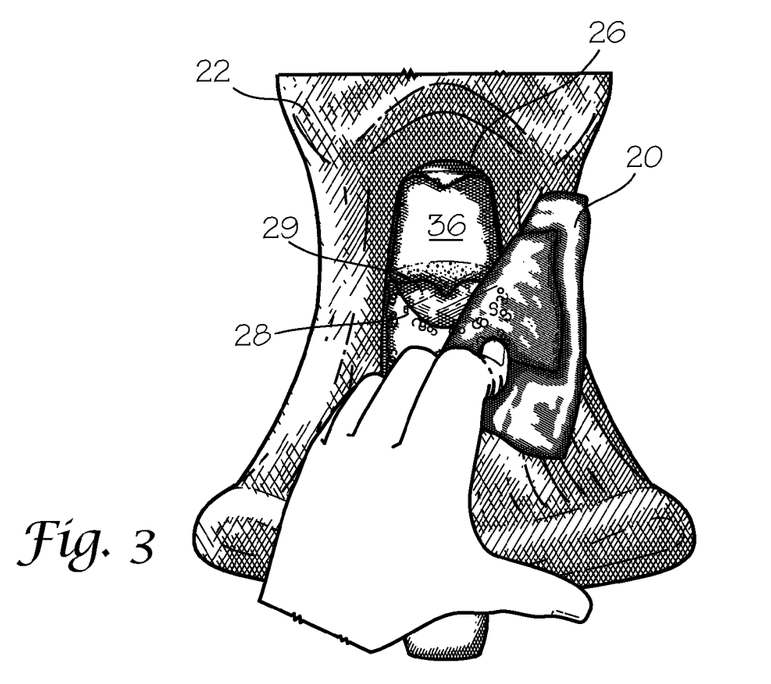
FIG. 3 provides a frontal view of an embodiment of the artificial anatomical model base structure of the subject invention in FIG. 2 with the replaceable skin component peeled back exposing the thyroid cartilage component through the tracheal access window.

FIG. 2 provides a frontal view of an embodiment of an artificial anatomical model 100 of the subject invention with the skin layer 16 removed, revealing a muscle portion 22 underneath. The replaceable skin component 20 is exposed and placed over a tracheal access window 26 (tracheal access window 26 is shown in FIG. 3). A tracheal structure 24 can be seen emerging from a lower portion of the model 100.

FIG. 3 provides a frontal view of an embodiment of the artificial anatomical model 100 of the subject invention as shown in FIG. 2 with the replaceable skin component 20 peeled back exposing a thyroid cartilage component 28 through the tracheal access window 26. A hyoid bone 36 is visible through the tracheal access window 26 in FIG. 3, positioned beneath the mandible region of the model. In the embodiment shown herein, a hyoid opening 29 is shown between the hyoid bone 36 and the thyroid cartilage component 28. This hyoid opening 29 is created, in one example, as a space between the thyroid cartilage component 28 and the hyoid bone 26, wherein a first portion and a second portion of the thyroid cartilage component 28 is associated with the hyoid bone 29, leaving a gap (hyoid opening 29) in the center. Through the hyoid opening 29, a cricoid membrane 30 (shown in FIG. 4) can be seen.

Figure 4:
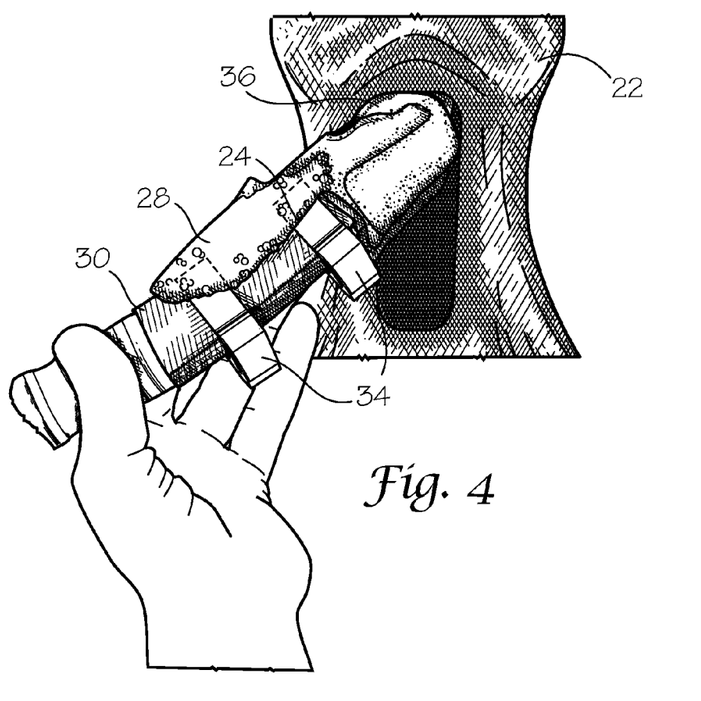
FIG. 4 provides a frontal view of an embodiment of the artificial anatomical model base structure of the subject invention with the tracheal structure partially removed from the model.
Figure 5:
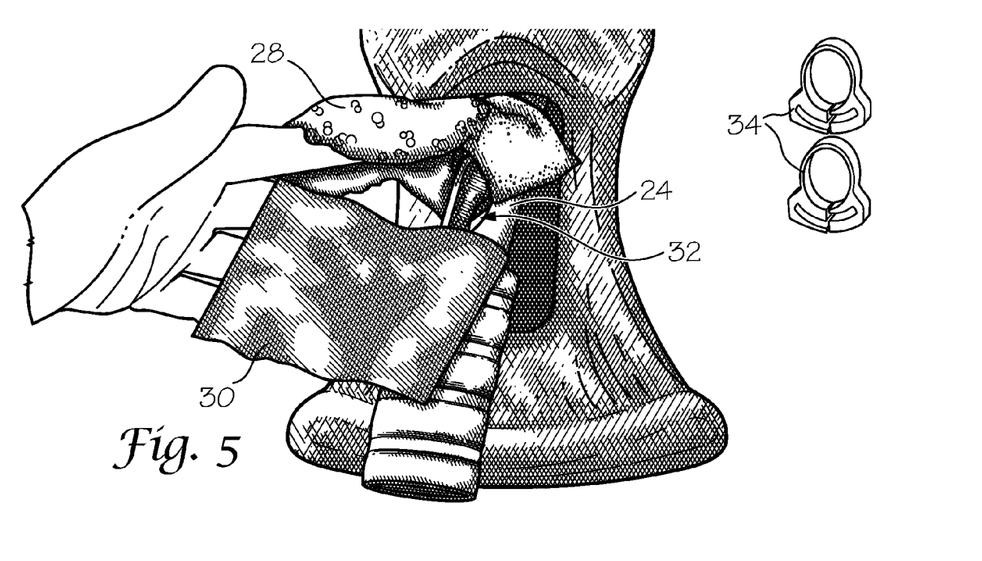
FIG. 5 provides a frontal view of an embodiment of the artificial anatomical model base structure of the subject invention with the tracheal structure partially removed from the model, the thyroid cartilage component lifted and the cricoid membrane being removed from the tracheal structure, demonstrating replacement of the cricoid membrane.

FIG. 4 provides a frontal view of an embodiment of the artificial anatomical model 100 of the subject invention wherein the tracheal structure 24 is partially removed from the model 100. A portion of the tracheal structure 24 is shown as surrounded by a cricoid membrane 30, and the thyroid cartilage component 28 is disposed over the cricoid membrane 30. The cricoid membrane 30 is attached to the tracheal structure 24 by ring clips 34 in the embodiment shown. Two ring clips 34 are shown in the embodiment of FIG. 4, one disposed on either side of a tracheal opening 32 (shown in FIG. 5), however, one ring clip 34 may be used to affix the cricoid membrane 30 to the tracheal structure 24, in other embodiments, or other means for attachment of the cricoid membrane may also be used in addition to or in place of the ring clips 34 shown herein. FIG. 5 provides a frontal view of an embodiment of the artificial anatomical model 100 of the subject invention with the tracheal structure 24 partially removed from the model 100, the thyroid cartilage, cartilage component 28 lifted from the tracheal structure 24 and the cricoid membrane 30 partially removed from the tracheal structure 24 revealing a tracheal opening 32. FIG. 5 shows a process of removal or adjustment of the position of the cricoid membrane 30 from the tracheal opening 32 by releasing the ring clips 34. Once the cricoid membrane 30 is removed from the tracheal structure 24, the membrane 30 can be replaced with a new cricoid membrane 30. Alternatively, once the cricoid membrane 30 has been used (i.e., an incision has been made there through), it can be used again by adjusting the cricoid membrane 30 by sliding it into a position enabling a new cut and/or puncture at or near the tracheal opening 32 to occur.

Figure 6:
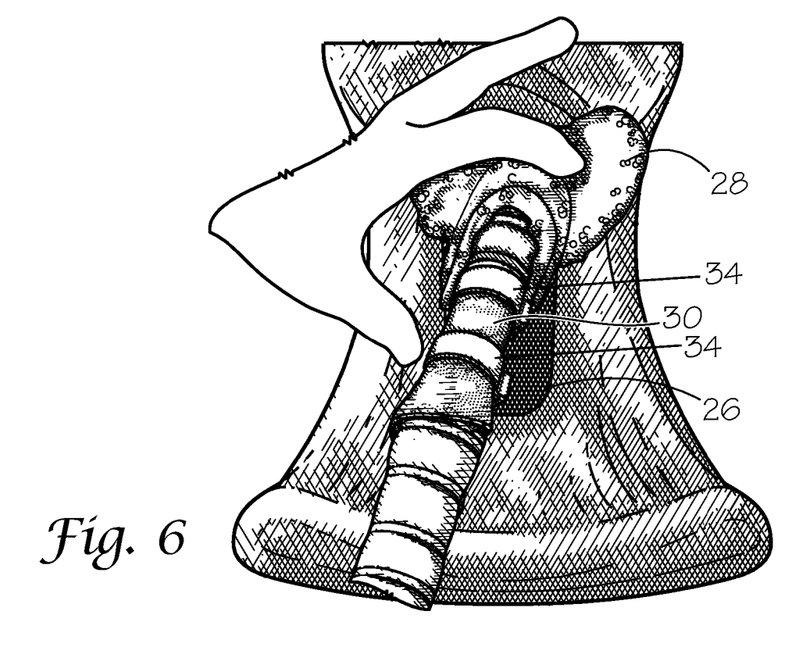
FIG. 6 provides a frontal view of an embodiment of the artificial anatomical model base structure of the subject invention wherein the cricoid membrane surrounds the tracheal structure at the tracheal opening.

FIG. 6 provides a frontal view of an embodiment of the artificial anatomical model 100 of the subject invention wherein the cricoid membrane 30 surrounds the tracheal structure 24 at the tracheal opening 32, and two ring clips 34 are used to secure the cricoid membrane 30 onto the tracheal structure 24. The thyroid cartilage component 28 has been lifted in the view of FIG. 6 to reveal the components of the device underneath the thyroid cartilage component 28. Once the cricoid membrane 30 is removed from the tracheal structure 24, the tracheal structure 24 can be re-inserted into the model 100 beneath the muscle portion 22. In a further embodiment a portion of the tracheal structure 24 may be attached or affixed to the mounting base 10. Other components of the model 100 may be attached to the mounting base 10 in varying embodiments.

Figure 7:
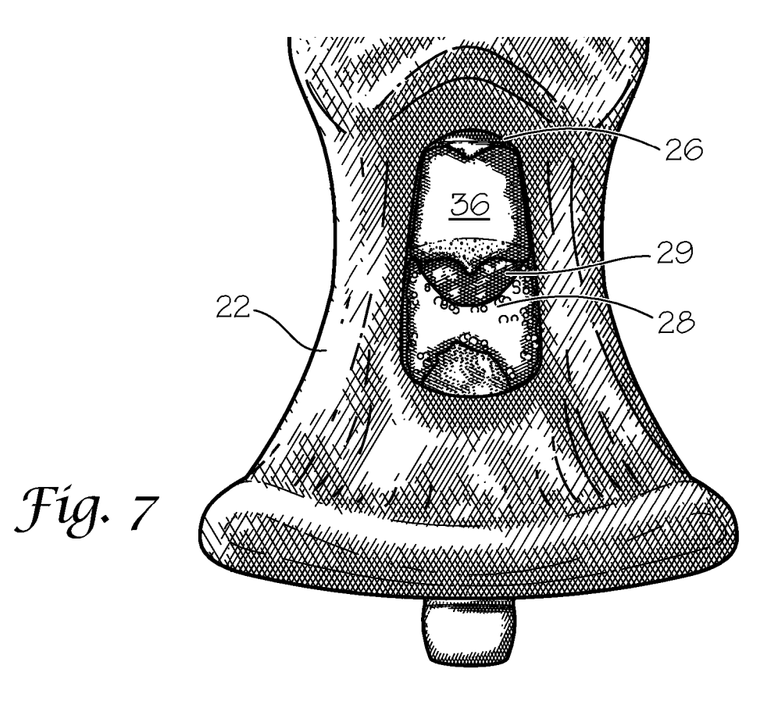
FIG. 7 provides a frontal view of an embodiment of the artificial anatomical model of the subject invention showing the tracheal structure placed within the model with the replaceable skin component removed demonstrating the placement of the hyoid bone beneath the mandible region of the model.

FIG. 7 provides a frontal view of an embodiment of the artificial anatomical model 100 of the subject invention showing the tracheal structure 24 placed within the model 100 with the replaceable skin component 20 removed (replaceable skin component not shown in FIG. 7) demonstrating the proper placement of the tracheal structure 24, such that the hyoid bone 36 is positioned beneath the mandible region 12 of the model 100. The cricoid membrane 30 can be seen between the hyoid bone 36 and the thyroid cartilage component 28 through the hyoid opening 29.

The terms "anatomic(al) model", "anatomic(al) device", and "model training device" are used interchangeably, herein. The term "hydrogel(s)" as used herein refers to a unique class of materials that contain a large amount of water and generally exhibit a high degree of elasticity and lubricity. These materials are ideal for simulating the physical properties of many living soft tissues. Hydrogels are materials that are wetable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either cross linked directly by chemical bonds or indirectly through cohesive forces such as ionic or hydrogen bonding.

The tissues and structures that "are comprised of, in part or in whole, a hydrogel," aside from hydrogel materials, may include, but are not limited to, hydrophilic polymers, interpenetrating or semi-interpenetrating polymer networks, fibers, silicone rubber, natural rubber, other thermosetting elastomers, other thermoplastic elastomers, acrylic polymers, other plastics, ceramics, cements, wood, Styrofoam, metals, actual human tissues, actual animal tissues, and any combination thereof. For model embodiments comprising one or more components, each component part may be constructed from one or more tissue analog materials.

The muscle portion(s), skin layer(s), fat layer(s), and bone(s) (including the tracheal structure) are formulated to simulate one or more physical characteristics of a target living tissue. These physical characteristics include, but are not limited to, uni-axial or multi-axial tensile strength or modulus, uni-axial or multi-axial compressive strength or modulus, shear strength or modulus, coefficient of static or dynamic friction; surface tension; elasticity; wettability; water content; electrical resistance and conductivity; dielectric properties; optical absorption or transmission, thermal conductivity, porosity, moisture vapor transmission rate, chemical absorption or adsorption; or combinations thereof. Each tissue or structure is designed so that one or more of its physical characteristics will sufficiently match the corresponding physical characteristic(s) of the relevant tissue on which the muscle portions, skin layers, fat layers, and bones is based. More specifically, each tissue analog material is preferably formulated so that the physical characteristic(s) of the tissue analog fall within a range that is no more than 50% lesser or greater than the targeted physical characteristic(s) of the relevant living tissue on which the tissue analog material is based.

The term "artificial" as used herein to describe an anatomic model refers to a model that is either synthetically manufactured or naturally manufactured in vivo and assembled with model components. The anatomic model includes model components such as, muscle portion, ligament structures, tendons, bones, skin, fat, and other such structures or "components." In the case of naturally manufactured artificial components, this may refer to actual tissues or anatomical structures procured from a cadaveric human or from a nonhuman subject that are removed from the subject processed and assembled with other artificial components.

The term "geometrically mimic" as used herein refers to a comparative relationship of a configuration of an artificial anatomical model, and/or artificial structural component thereof, with a target anatomical structure wherein such configuration comprises one or more similar geometric features of the target anatomical structure to be mimicked, such as length, width, diameter, thickness, cross-section, and/or, in most cases general shape of a particular target anatomical structure.

The term "human or non-human animal tissue" as used herein refers to the one or more tissues that constitute a human or non-human animal anatomical structure. "Anatomic structures" may include tissue types, bone types, organ types, and/or part of organ(s).

As used herein the term "human or non-human animal anatomical structure" refers to one or more tissue structural components that make up a part of anatomy of a human or non-human animal. A part of anatomy may include, but is not limited to, whole organs, parts of an organ, or a section of a body comprising one or more tissue types, organ types, and/or part of organ(s).

As used herein, the terms "tracheal opening" and "tracheal aperture" can be used interchangeably.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. An artificial anatomical model useful for cricothyroidotomy training, comprising:
a mandible and neck base structure that geometrically mimics at least a portion of the mandible and neck of a human or non-human animal comprised of, at least in part, a muscle portion, wherein said neck base structure comprises a neck region with a center portion comprising an opening in the center portion, said opening defining a tracheal access window in said muscle portion;
a tracheal structure disposed within and removable from the neck base structure, said tracheal structure comprises a tracheal aperture, wherein at least a portion of the tracheal aperture is aligned with the tracheal access window, wherein a portion of the tracheal structure is covered by the muscle portion such that a portion of the tracheal structure is aligned with the tracheal access window;
a replaceable cricoid membrane surrounding the tracheal structure at the tracheal aperture;
a thyroid cartilage component affixed at one end to the tracheal structure- and disposed ventral to the cricoid membrane;

a replaceable skin component disposed over the neck base structure at the tracheal access window but ventral to the thyroid cartilage component; and a skin layer disposed over at least a portion of the muscle portion, ventral to the replaceable skin component, wherein the skin layer comprises at least one skin layer opening which superimposes a portion of the tracheal access window, such that when the skin layer is disposed over the neck base structure, at least a portion of the replaceable skin component is visible through the at least one skin layer opening in order to allow an incision to be made in the portion of the replaceable skin component which appears through the skin opening.

2. The model of claim 1, wherein the skin layer is comprised of, in part or in whole, a hydrogel, said skin layer geometrically mimics at least a portion of a human or non-human animal skin tissue and simulates at least one predetermined physical characteristic of said skin possessing human or non-human animal skin tissue.

3. The model of claim 1, wherein at least one predetermined physical characteristic of the replaceable skin component or cricoid membrane comprises at least one of the following: color, tensile modulus, shear strength, puncture resistance, compressive modulus, dielectric constant, electrical conductivity, or thermal conductivity.

4. The model of claim 1, wherein the tracheal structure, the cricoid membrane, and the replaceable skin component, are independently removable and replaceable of one another.

5. The model of claim 1, wherein the tracheal structure, the cricoid membrane, and the replaceable skin component, are comprised of tissue analog materials.

6. The model of claim 1, further comprising a fat layer, wherein said fat layer is disposed over at least a portion of the muscle portion.

7. The model of claim 1, further comprising a fat layer ventral to the replaceable skin component, and under the skin layer.

8. The model of claim 7, wherein the fat layer is comprised of, in part or in whole, a hydrogel, said fat layer geometrically mimics at least a portion of a human or non-human animal fat tissue, wherein said fat layer comprises a small fat layer opening which superimposes a portion of the tracheal access window.

9. The model of claim 1, wherein the model includes a mounting base.

10. The method of claim 9, wherein a portion of the tracheal structure is connected to the mounting base.

11. The model of claim 1 wherein the cricoid membrane is secured to the tracheal structure.

12. The model of claim 11, wherein the cricoid membrane is secured with one or more ring clips.

13. The model of claim 1, wherein the muscle portion is comprised of, in part or in whole, a hydrogel, wherein said muscle portion geometrically mimics at least a portion of a human or non-human animal muscular tissue.

* * * * *